(12) United States Patent
Wright et al.

(10) Patent No.: US 6,350,972 B1
(45) Date of Patent: Feb. 26, 2002

(54) INDUCTION-BASED HEATED DELIVERY CONTAINER SYSTEM

(75) Inventors: David Gregg Wright, Hermitage; Jack Wendell LaFevor, Lebanon, both of TN (US)

(73) Assignee: Aladdin Temp-Rite, LLC, Nashville, TN (US)

( * ) Notice: Subject to any disclaimer, the term of this patent is extended or adjusted under 35 U.S.C. 154(b) by 0 days.

(21) Appl. No.: 09/579,204

(22) Filed: May 26, 2000

Related U.S. Application Data

(60) Provisional application No. 60/136,114, filed on May 26, 1999.

(51) Int. Cl.$^7$ ................................................. H05B 6/12
(52) U.S. Cl. ....................... 219/621; 219/622; 219/624; 219/627; 219/667; 126/246; 126/375; 99/DIG. 14
(58) Field of Search ........................... 219/621, 620, 219/622, 624, 663, 667, 626, 627; 126/246, 375; 99/DIG. 14, 451

(56) References Cited

U.S. PATENT DOCUMENTS

| | | | |
|---|---|---|---|
| 3,745,290 A | 7/1973 | Harnden et al. | 219/10.49 |
| 4,256,945 A | 3/1981 | Carter et al. | 219/10.75 |
| 4,321,446 A | 3/1982 | Ogawa et al. | 219/10.49 R |
| 4,695,713 A | 9/1987 | Krumme | 219/553 |
| 4,816,646 A | 3/1989 | Solomon et al. | 219/387 |
| 5,134,265 A | 7/1992 | Dickens et al. | 219/10.491 |
| 5,227,597 A | 7/1993 | Dickens et al. | |
| 5,445,286 A | 8/1995 | Guimarin | 220/427 |
| 5,508,498 A | 4/1996 | Rheinish et al. | 219/730 |
| 5,603,858 A | 2/1997 | Wyatt et al. | |
| 5,611,328 A | 3/1997 | McDermott | |
| 5,628,241 A | 5/1997 | Chavanaz et al. | 99/331 |
| 5,643,485 A | 7/1997 | Potter et al. | |
| 5,709,914 A | 1/1998 | Hayes | 428/35.1 |
| 5,750,962 A | 5/1998 | Hyatt | 219/528 |
| 5,880,435 A | 3/1999 | Bostic | 219/387 |
| 5,892,202 A | 4/1999 | Baldwin et al. | 219/387 |
| 5,954,984 A | 9/1999 | Ablah et al. | 219/621 |
| 6,005,233 A | * 12/1999 | Wyatt | 219/621 |
| 6,097,014 A | * 8/2000 | Kirsch | 219/621 |

FOREIGN PATENT DOCUMENTS

| | | | |
|---|---|---|---|
| EP | WO 98/05184 | | 2/1998 |
| JP | 3-4479 | * | 1/1991 |

* cited by examiner

Primary Examiner—Philip H. Leung
(74) Attorney, Agent, or Firm—Ohlandt, Greeley, Ruggiero & Perle, LLP

(57) ABSTRACT

A system for heating food delivery containers which comprises: a container for delivering heated food which comprises at least one food compartment having at least one self-regulating heat storage member disposed therein, wherein the self-regulating heat storage member comprising a magnetic material and, optionally, a heat storage material; and an induction generating source which is capable of heating the self-regulating material to a predetermined temperature. The system further comprises an automatic shut-off mechanism which is capable of turning off the induction generating source when the heat storage member reaches the predetermined temperature.

14 Claims, 12 Drawing Sheets

INDUCTION-BASED HEATED DELIVERY CONTAINER SYSTEM

This application claims the benefit of U.S. Provisional Application No. 60/136,114, filed May 26, 1999, the contents of which are hereby incorporated by reference into this application.

BACKGROUND OF THE INVENTION

A major difficulty faced by owners of food delivery establishments is maintaining the temperature of hot foods, such as pizza, sandwiches, Chinese food, and the like, during delivery of the hot food from the kitchen to the customer. In colder climates, the difference in temperature between the heated food and the environmental temperature may be considerable, and thus result in significant cooling of the food, which may affect food quality and taste during consumption.

Traditionally, pizza delivery establishments have addressed this problem by inserting the heated pizza into a box, usually formed from cardboard, and then into a receptacle or bag formed of thermal insulating material where the pizza would be kept during the delivery process. However, such thermal insulating pizza bags are limited in their ability to maintain the desired temperature by factors, such as delivery time and environmental temperature.

Still other heated food delivery systems utilize integrated electric energy heaters which require relatively lengthy preheating period, e.g., up to two hours, before the food delivery container is available for the first heated delivery. As can be appreciated, a significant amount of energy and time is required to accomplish the foregoing, neither of which is conducive for fast food establishments, such as pizza restaurants. Also, in order to have an adequate amount of heated delivery containers ready during periods of peak delivery, the user would have to anticipate the number of heated delivery containers that would be needed and then commence the heating procedure well in advance of the actual use of the heated delivery container. Of course, if the user over estimates the number of heated delivery containers eventually required, costly energy is wasted in order to heat the unused containers. In the alternative, if the user underestimates the number eventually needed, the required lead/preheat time would preclude the user from obtaining a properly heated delivery container in the short time period required to satisfy today's consumers.

In addition to the significant amount of energy and lead time required to preheat conventional food delivery containers, the space required by conventional pizza bag delivery systems is quite extensive due to peak time demand. For example, U.S. Pat. No. 4,816,646 to Solomon et al. discloses a typical conventional receptacle for maintaining the desired cooked temperature of food during delivery from the kitchen to the consumer. Solomon et al. utilizes a conventional electric resistance heater. FIG. 4 of the Solomon et al. patent illustrates a plurality of such receptacles mounted on shelves in a "ready" condition. Thus, in order to have an adequate number of heated delivery containers ready during peak demand, a substantial panel of the food establishment's precious cooking space must be dedicated to preheating heated delivery bags.

Another deficiency of conventional heated food delivery containers, particularly pizza bags, is that they are designed to have a single food storage cavity for transporting the food product in a heated condition. Although many food establishments have attempted to accompany more than one food product into each container during peak demand, it results in inadequate interior temperatures within the container and, thus, reduces the quality of the transported food product. A need has arisen for an efficient bag which can carry more than one food container and yet maintain uniform heat throughout the bag so that one container is not hotter than another.

Many conventional systems for heating conventional food delivery containers, such as pizza bags, rely on heating the food delivery container or a heating member which is then inserted into the food delivery container for a predetermined time period at a predetermined temperature. These conventional heating systems fail to provide a method for self-regulation of the heating system unless a regulator, like a thermostat, is added to the system. With such conventional heating systems, a food delivery container that has been heated, but has not cooled to ambient temperature, is still reheated during the subsequent heating cycle for the same predetermined time period as during the initial heating cycle. The use of such predetermined time period for subsequent heating cycles results in unnecessary expenditure of energy and time. Certainly, in today's competitive business atmosphere both foregoing commodities must be utilized more efficiently than is provided by conventional food delivery containers, especially pizza delivery containers.

In addition to economy of time and energy, safety of the food service worker is a primary factor. As stated above, conventional food delivery containers, particularly pizza bags, rely on a predetermined time-period for heating the container. However, if the timer fails to deactivate the heating procedure, the temperature of the heating member will continue to rise. This result could not only destroy the food delivery container, but also creates a significant safety hazard to the food service personnel. The nature of the use of food delivery containers necessitates a great deal of actual handling by the food service worker under harried and hurried conditions. A need exists for a food delivery container that not only provides a shorter heating period, but also provides a fail-safe mechanism to prevent the container from over heating and still allow safe handling by the food service worker after the heating cycle.

A need continues to exist for a heated food delivery container that is able to maintain a heated storage area at an elevated temperature relative to ambient temperature, uniformly throughout the delivery container. A need also exists for a heat retentive delivery container that (1) utilizes less time to heat, (2) is self-regulating in its energy consumption during the heating process to require less energy and less time during subsequent heating cycles, and (3) has a fail-safe mechanism to prevent heating higher than a predetermined temperature. A need also continues to exist for a heated food delivery container that requires less preparation time and storage area than conventionally available heated delivery containers. An additional need exists for a system, which is capable of substantially reducing the lead time required to preheat a heated delivery container to its preferred transport temperature. A further need exists for a system which is self-regulating with respect to energy consumption and length of time of activation.

The present invention pertains to a storage container for maintaining food items at a desired temperature during transport thereof. More particularly, this invention pertains to food storage/delivery containers which include a novel self-regulating heat induction system which only heats the delivery container to a predetermined temperature regardless of the initial temperature of the delivery container when it is heated or reheated by the system. The present invention provides a novel induction-based heated delivery container system, which is capable of heating delivery containers in substantially less time than conventional electric heater or phase change technology. Due to the substantially reduced preheating time required, the container systems according to the present invention are capable of heating more containers per energy generation station than conventional systems, thus substantially reducing the amount of kitchen space required for preparation and temporary storage of the delivery containers. Additionally, the present invention provides a unique heating system, which is capable of self-regulation, i.e., brings each reused container back up to transport temperature without having to heat for a complete preheating cycle, i.e., starts at the current temperature of the container and only utilizes the required amount of energy to heat the container to its predetermined transport temperature. This greatly reduces preheating time, allows for rapid reuse of returned containers, and speeds up the entire delivery process. The present invention also provides a fail-safe mechanism to prevent the food service container from heating above a predetermined temperature. Finally, the novel heating system of the present invention allows for the transport of up to three separate pizza boxes per container without compromising food quality or transport temperature for each transported pizza contained therein.

SUMMARY OF THE INVENTION

A container for delivering heated food which comprises a receptacle formed from a substantially flexible material having at least one fail-safe heat storage member. The present invention also provides a novel self-regulating system and method for energizing such a container utilizing magnetic induction energy.

The self-regulating heat storage member comprises an inductive or magnetic material having a Curie-point and a heat storage material. (The terms "inductive material," "magnetic material" and "Curie point material" are used interchangeably herein.) The magnetic material is preferably nickel, chrome, iron, or mixtures thereof and with other trace materials present. The heat storage material is preferably aluminum. Use of aluminum for a heat storage member is a novel concept because aluminum is a heat dissipator. However, when aluminum is embedded within the fabric, it acts as a heat sink such that it stores heat in the fabric. The self-regulating heat storage member is preferably formed by casting or a combination of casting/cladding the heat storage member to the magnetic material. The aluminum acts as a heat sink and storage battery. The magnetic material preferably has a Curie point of between about 225° F. to about 400° F. It is preferable that the magnetic material contains holes and/or slits for the purpose of increasing attachment points to (1) increase the transfer of heat from the magnetic material to the heat storage material during the heating process, and (2) minimize possible detachment of the heat storage material from the magnetic material over time and use. As will be discussed below, the configuration of the holes and slits of the magnetic material that are "filled" with aluminum provide a mechanism for compensating for and utilizing the different rates of expansion/contraction of the magnetic material versus the aluminum. The heat storage members for the present invention are approximately 8" in diameter and preferably 8.25" in length.

The present invention provides a container for delivering heated food which comprises at least one compartment having at least one self-regulating heat storage member disposed therein, wherein the self-regulating heat storage member comprises a magnetic material which is capable of being heated to a predetermined temperature by means of induction.

In one embodiment of the invention, the compartment has an upper panel and a lower panel, and wherein a first self-regulating heat storage member is disposed within the lower panel of the compartment or alternatively within the upper panel of the compartment.

In another embodiment of the invention, the container includes a first self-regulating heat storage member disposed within the lower panel of said compartment and a second self-regulating heat storage member disposed within the upper panel of the compartment. The self-regulating heat storage member further comprises a heat storage material disposed about the magnetic material, wherein the heat storage material acts as a heat sink or storage battery. The magnetic material is selected from the group consisting of: nickel, chrome, iron, and mixtures thereof. The heat storage material comprises a material selected from the group consisting of aluminum, cast iron and mixtures thereof. It is a further embodiment of the invention, wherein the magnetic material has holes or slits therethrough and panels of the heat storage material are disposed within said holes or slits.

The present invention provides a system for heating food delivery containers which comprises: a container for delivering heated food which comprises at least one food compartment having at least one self-regulating heat storage member disposed therein, wherein the self-regulating heat storage member comprising a magnetic material; and a means for generating induction energy which is capable of heating said magnetic material to a predetermined temperature or power percentage. In one embodiment of the invention, the system further comprising an automatic shut-off control, which is capable of turning off said induction generating means when said magnetic material reaches said predetermined temperature.

The induction generating means comprises at least one means for generating a magnetic field disposed substantially in alignment with said heat storage member when said container is disposed adjacent to said induction generating means. The system includes a container with a compartment, wherein the compartment has an upper panel and a lower panel.

In another embodiment of the present invention, the first self-regulating heat storage member has a magnetic material disposed within either the upper panel of said compartment or the lower panel of said compartment, the induction generating means comprises at least one means for generating a magnetic field disposed therein in such a manner that said magnetic material is in substantial alignment with the first magnetic field generating means, when the container is disposed adjacent to the induction generating means.

In a further embodiment of the invention, the self-regulating heat storage member further comprises a heat storage material in thermal contact with the magnetic material, wherein the heat storage material acts as a heat sink and storage battery. The magnetic material is selected from the group consisting of: nickel, chrome, iron and mixtures thereof. The heat storage material is selected from the group consisting of: cast iron, aluminum and mixtures thereof.

In one embodiment of the invention, the magnetic material has holes or slits therethrough and panels of the heat storage material are disposed in said holes or slits.

The present invention provides a method of heating a food delivery container which comprises: placing a container about an induction generating means, the container comprising at least one food compartment having at least one self-regulating heat storage member disposed therein; activating said induction generating means to heat the heat storage member to a predetermined temperature; and deactivating the induction generating means once the heat storage member reaches the predetermined temperature. In one embodiment of the method, the deactivation step occurs automatically at said predetermined temperature or at a predetermined power percentage. The automatic shut-off control for turning off the magnetic field generator avoids undue waste of energy, damages to the delivery container or injury to the user.

A method of heating a food delivery container according to another embodiment of the present invention comprises: (a) placing a food delivery container having at least one self-regulating heat storage member about the exterior of an inductive power source, wherein the magnetic coil(s) align with the heat storage member; (b) activating the inductive power source such that the magnetic coil(s) contained therein generates a magnetic or electric field sufficient to energize the heat storage member disposed within the magnetic or electric field to a predetermined temperature or power percentage; (c) deactivating the inductive power source once the heat storage member attains the predetermined temperature; and (d) automatically reactivating the inductive power source after a preset time delay period.

The induction power source comprises an inverter connected to at least one inductive or magnetic coil which is capable of producing a magnetic or electric field that energizes the magnetic particles of the heat storage member until its predetermined power percentage is reached.

The present invention also includes a food delivery container having a fail-safe feature that prevents the food delivery container from over-heating, and thus provides a novel safety feature for food delivery containers, particularly pizza delivery containers.

Further objects and features of the present invention will be apparent from a review of the following specification including the drawings, wherein key features have been given like numbers.

DETAILED DESCRIPTION OF THE PREFERRED EMBODIMENT

The present invention can best be described by reference to the attached drawings which depict a container for delivering heated food comprising a food carrying compartment formed from a substantially flexible material that further comprises a self-regulating heat storage member. The present invention also provides a novel system and method for energizing such a container utilizing magnetic induction energy.

Figure 1:
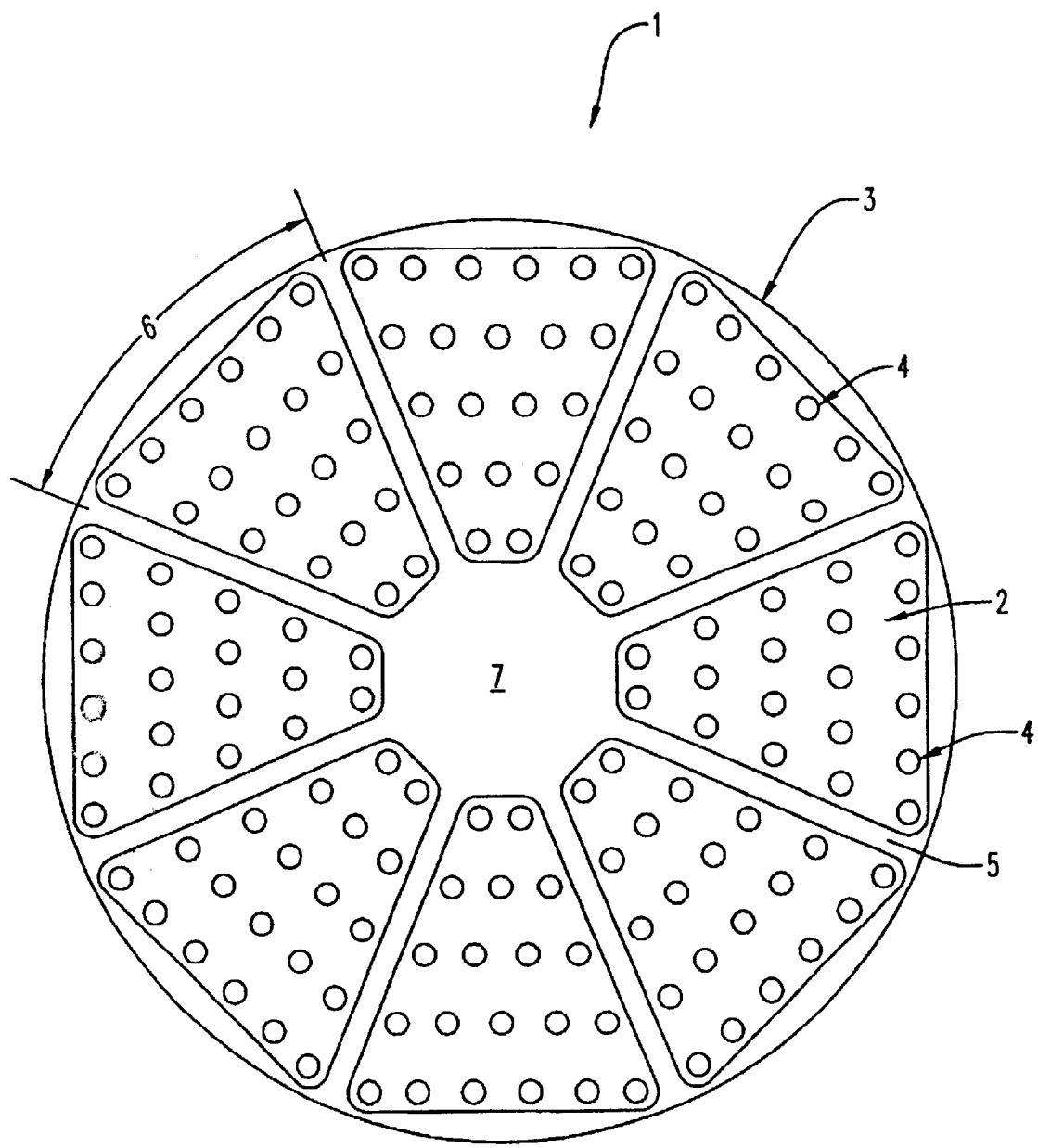
FIG. 1 is a top plan view of the preferred heat storage member of the present invention.

FIG. 1 illustrates a preferred self-regulating heat storage member 1 according to the present invention. Heat storage member 1 functions to translate the magnetic energy from the energy source into heat and also functions as a sensible or self-regulating heat storage battery. Self-regulating heat storage member 1 is circular and comprises multiple individual triangular pieces of a self-regulating material having a predetermined Curie point. The Curie point constant of a particular material is the temperature at which the material loses its magnetic properties. The material is heated via excitement of the metal particles contained therein, eventually attaining a temperature at which it loses its magnetic properties, i.e., its Curie point. Various materials may be used as self-regulating material in accordance with the present invention; provided that they are specifically selected for application to the food for which the container shall be used to transport. However, when the heated food delivery container is used for delivery pizza, it is preferred that the self-regulating material has a Curie point from between about 225° F. to about 400° F. Most preferably, the self-regulating material has a Curie point of about 275° F. The self-regulating material is preferably selected from, but not limited to, the group consisting of: nickel, chrome, iron or mixtures thereof. A non-limiting example of such a preferred self-regulating material is available from Sumitomo Specialty Metals in Japan under the trade name MS-135.

The self-regulating heat storage member 1 also comprises a heat storage material that provides sensible heat capacity, conductive properties and, thus, acts as both a heat sink and a storage battery. The heat storage material is preferably aluminum, cast iron or mixtures thereof Aluminum is preferred because of its conductive properties. Aluminum heats quickly and thoroughly, without the "cold spots" exhibited when certain phase-change materials are heated. Aluminum is also preferred because it is relatively lightweight, which is highly desirable in heated food delivery applications.

The preferred heat storage member 1 is comprised of magnetic material 2 and heat storage material 3. Although self-regulating heat storage member 1 may be any shape, it is preferred that it has a circular or disk-like shape. The heat retentive storage member 1 may be formed by various methods such as casting, cladding, a combination of casting and cladding, and adhering the heat storage material and self-regulating material together.

Forming the heat storage member by either casting or combination cast/clad is preferable to cladding. When the heat storage member 1 is formed by casting, it is preferred that the magnetic material 2 be constructed to have holes 4 and/or slits 5. Slits 5 are preferably positioned so that pie-shaped sections 6 and a central aperture 7 are formed. The magnetic material is then placed into a mold so that the lower surface of the magnetic material is substantially flush against the mold. Preferably, the magnetic material is centered in the mold. Then molten heat storage material is poured into the mold so that the heat storage material flows into the holes and slits and around the perimeter of the magnetic material. Because the lower surface of the magnetic material is substantially flush against the mold, the molten heat storage material does not encapsulate the magnetic material. After the heat storage material has cooled, the heat storage material is released from the mold. The holes and slits provide greater surface area contact between the heat storage material and the self-regulating material, and, thus, greater adhesion between the two materials. Since the heat storage material and the self-regulating material expand and contract at different rates in response to change in temperature, utilizing a casting method increases points of adhesion. Furthermore, greater surface area contact between the magnetic material and the heat storage material provided by the holes and slits also facilitates the transfer of heat from the magnetic material to the heat storage material during the heating cycle.

Another method of adhering the heat storage material to the self-regulating material is to clad the self-regulating material to the heat storage material by cold, warm or hot rolling. In the process of cladding, a sheet of heat storage material is placed adjacent a sheet of self-regulating material. Both sheets are then passed through two rollers in order to adhere the sheets to each other. Unlike the casting process, no holes are present in cladding. Additional adhesive comes from the additional surface contact. As stated above, the heat storage material and the self-regulating material have different rates of expansion and contraction in response to change in temperature. Over time and use, heat regulating members formed by cladding the heat storage material to the magnetic material are expected to demonstrate warping and expansion. It is even possible that the extent of warping and expansion may result in the heat storage material completely disengaging from the self-regulating material.

A combination of the two above methods may be employed to form the heat storage material. Metal triangles are put into a mold. A stamped aluminum disk is placed in the mold and heated until almost molten. Then using high pressure, the triangles are pressed into the softened aluminum. While cladding may be preferred for cost effectiveness, the combination cast/clad is preferable because it provides better adhesion than the two methods. Furthermore, the cast/clad combination minimizes use of Curie point metal. Since the Curie point metal is expensive, the cast/clad combination is somewhat cost effective as well.

Alternatively, the self-regulating material and the heat storage material may be mechanically fastened by epoxies and fasteners. However, such an approach is most likely to be more expensive than either cladding or casting.

Figure 2:
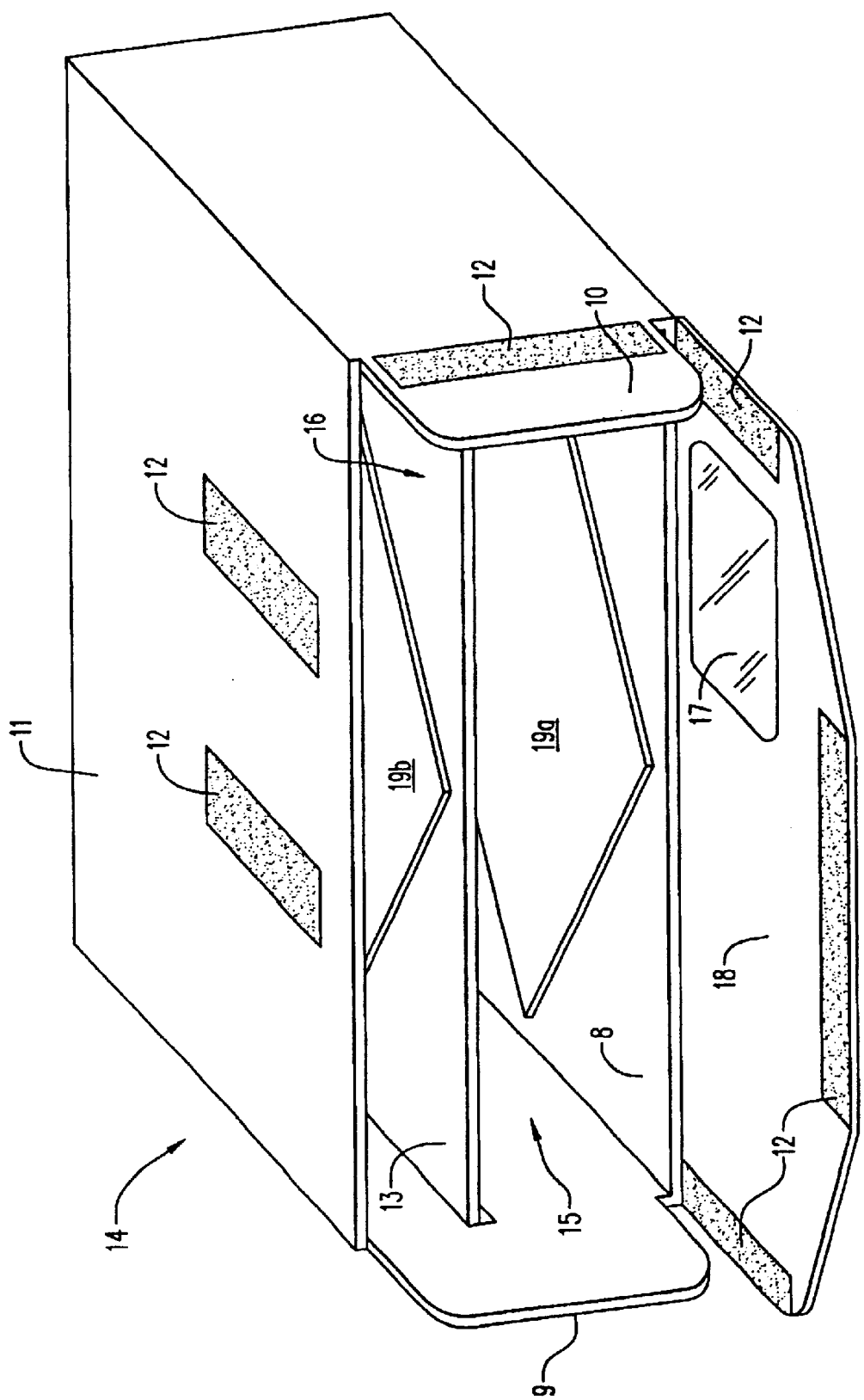
FIG. 2 is a top front perspective view of one embodiment of heated food delivery container of the present invention with the closure in the open position displaying the two interior pockets each having a heat storage member pouch disposed therein.

FIG. 2 illustrates one configuration of food delivery container 14, which is substantially box-shaped, and has a lower panel 8, sides 9, 10 and upper panel 11. Preferably, lower panel 8 extends to provide a flap 18 that is capable of moving from an open position, as shown in FIG. 2, to a closed position (not shown). To assist flap 18 in maintaining its closed position (not shown) corresponding loop and hook fasteners 12 are positioned on the interior of flap 8 and on the exterior of food delivery container 14. Loop and hook fasteners 12 are preferred because they are easy to fasten and unfasten, and because loop and hook fasteners are most often formed from relatively non-heat storage materials. Flap 18 may also have a transparent window area 17, which is preferably formed from a clear, flexible plastic material. A divider 13 is positioned in the interior of the food delivery container to provide a first interior compartment 15 and a second interior compartment 16. The interior compartment 15 has twice the volume as interior section 16 in order to accommodate at least two pizza boxes at one time. This two-compartment bag design may be made to include a retrofit sleeve that is sewn in or attached with velcro into the interior of the container.

Still referring to FIG. 2, two heat storage members (not shown in FIG. 2) are positioned within interior compartment 15 adjacent lower panel 8 and within interior compartment 16 adjacent the divider or lower panel 13 of compartment 16. For safety purposes, two heat storage member pouches are formed by positioning heat resistant material 19 over the heat storage members and by fastening the edges of the heat resistant material to lower panel 13 and to divider 13, respectively.

Figure 3A:
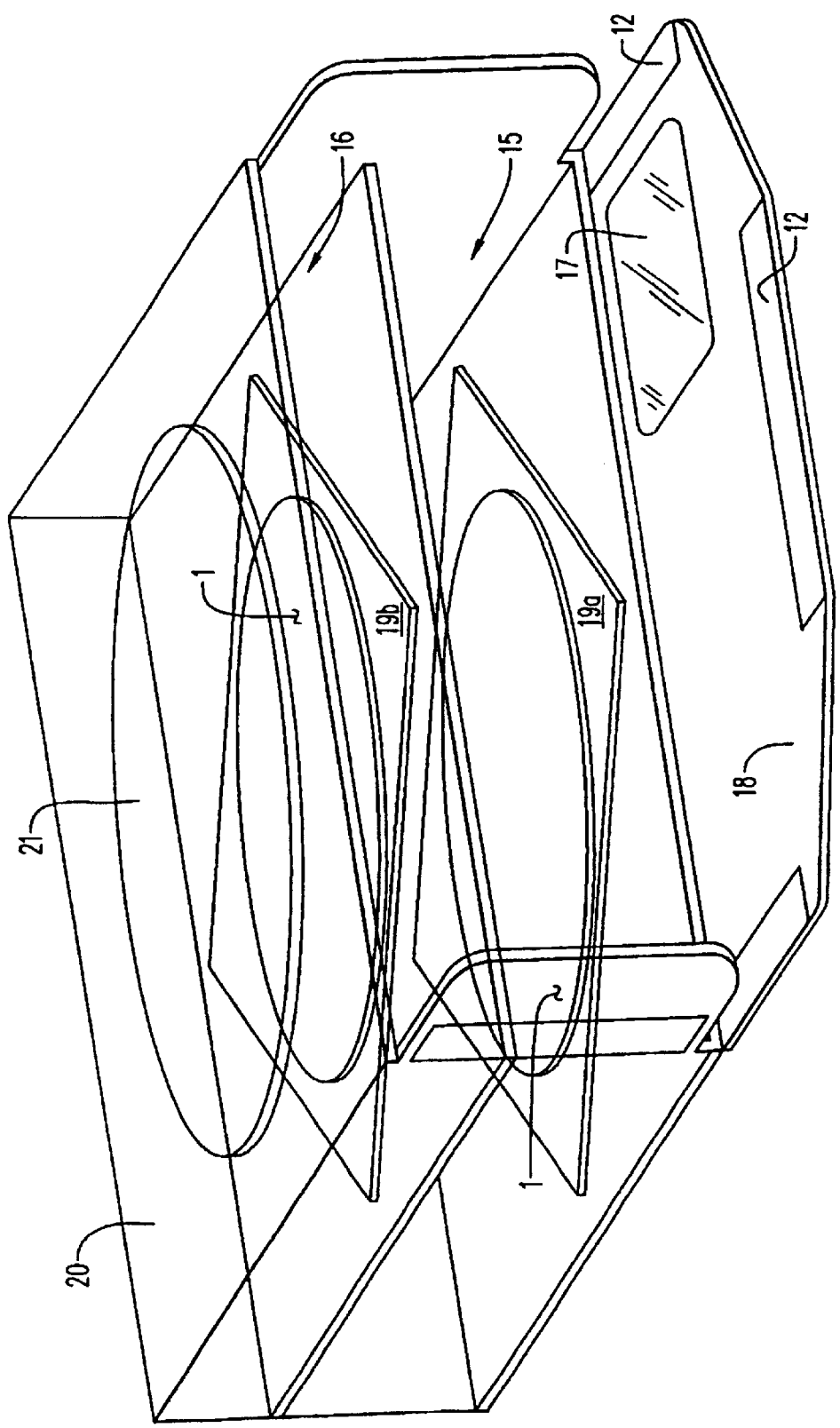
FIG. 3a is a schematic view of the two-compartment heated delivery container of FIG. 2 further illustrating the disposition of each heat storage member within its respective heat storage member pouch.

Referring to FIGS. 2 and 3a, it can be clearly understood that the illustrated food delivery container can accommodate up to three pizza boxes.

FIG. 3a illustrates the placement of both heat storage members 1 within each respective pouch 19 for the two-compartment delivery bag. In addition, rear wall 20 of the food delivery container is shown. A first pizza box and a second pizza box may be placed in the first interior compartment 15. A third pizza box may be placed in the second interior compartment 16. The first pizza box is adjacent the lower heat storage supply 19a and the upper heat storage supply 19b is disposed between the second and third pizza box. Thus, when three pizza boxes are in the food delivery container a vertical heat channel forms. The first pizza box receives conductive heat from the heat storage supply 19a and from the bottom of the second pizza box. The second pizza box receives conducted heat from the bottom pizza and conducted heat from the upper heat supply 19b. The third pizza box receives conducted heat from the upper heat supply 19b. As discussed above, the food delivery container preferably has insulation 21 incorporated in upper panel 11. The insulation retains heat in the food delivery container and assists in maintaining the vertical heat channel. The foregoing configuration and heat transfer allows the three pizza/pizza boxes to equalize and for the hottest pizza/pizza boxes and storage members to distribute heat to the remaining pizza boxes.

Alternatively, the food delivery container can be used for holding only one or only two pizza boxes. In the case of a delivery container which is capable of transporting two pizza boxes, both the first and the second pizza boxes would be placed in first interior compartment 15. The first and second pizza boxes would create a vertical heat channel in the same manner as the first and second pizza boxes described above in the three pizza box example. Because second interior compartment 16 is empty, it collapses against first interior compartment 15. Upper panel 11 having insulation 21 will then be adjacent the first interior compartment and will provide additional insulation for the first interior compartment. When only one pizza box is placed in the food delivery container, the single pizza box is placed in first interior compartment 15. Upper panel 11 collapses against the divider. The single pizza then receives conductive heat from both lower heat supply 19a and upper heat supply 19b. Insulation 21 rests against upper heat supply 19b and provides additional insulation to first interior compartment 15.

Figure 3B:
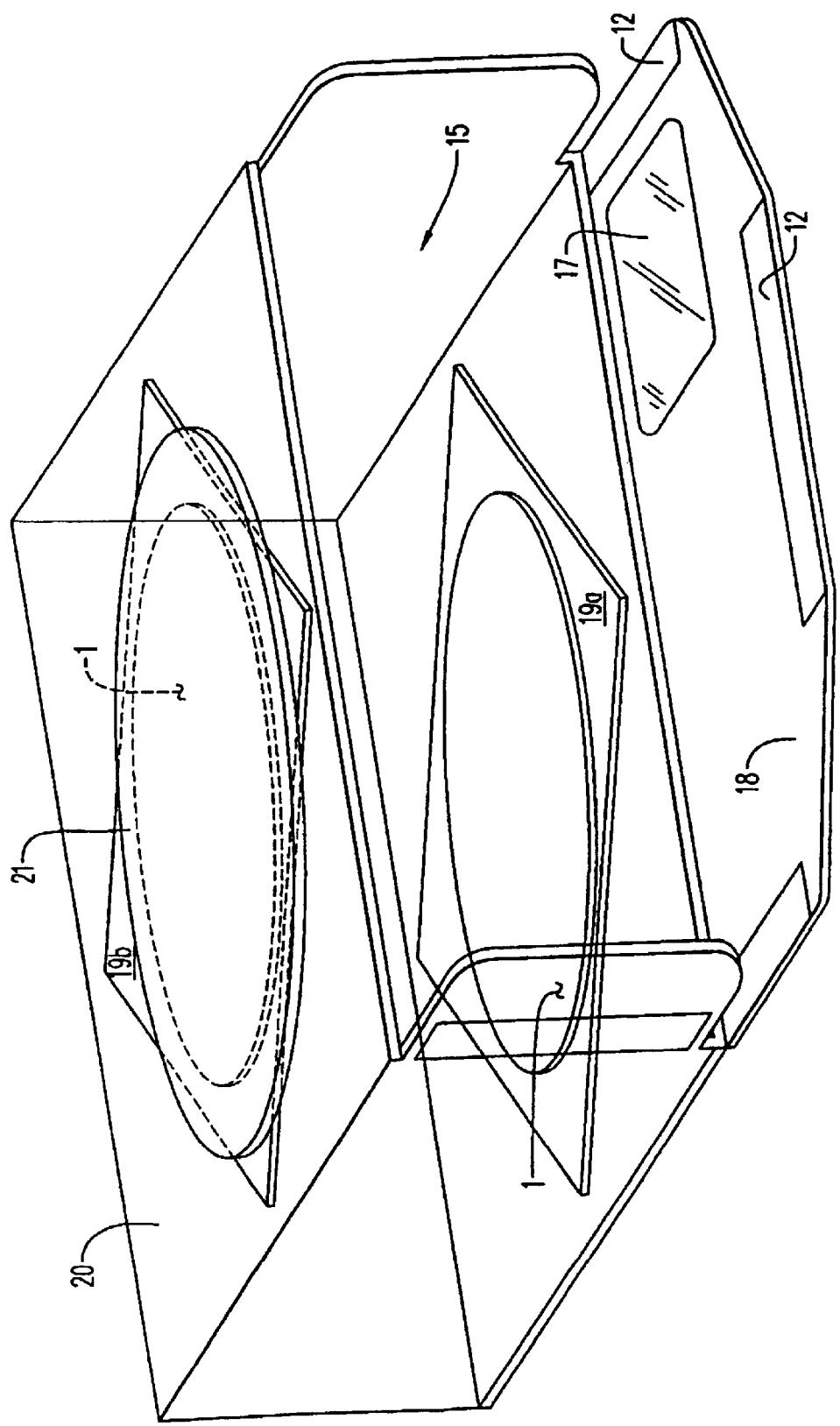
FIG. 3b is a schematic view of one-compartment heated delivery container, further illustrating the disposition of each heat storage member within its respective heat storage member pouch.

The preferred embodiment is a one-compartment food delivery container as depicted in FIG. 3b. In the one-compartment configuration, the heat storage members 1 are positioned within the lower 8 and upper panels 11 of the container without interior divider 13. FIG. 3b illustrates the placement of both heat storage members 1 within each respective pouch 19. This configuration is preferred because heat is emitted from both the upper and lower panels and maintains uniform heat without limitation of space from use of a divider. Another embodiment of the one-compartment food delivery container contains only one heat storage member. The heat storage member is located within either upper panel 11 or lower panel 8 of the container.

Side walls 9,10, lower panel 8, upper panel 11, flap 18 and rear wall (not shown) are formed from a substantially flexible enclosure material that is resistant to a temperature that is from about 25° F. to about 100° F. greater than the Curie point of the self-regulating material. When the self-regulating material has a Curie point of about 275° F., it is preferred that the enclosure material is resistant to temperatures from about 300° F. to about 375° F. Preferably, the enclosure material is a heat resistant fabric. Examples of possible heat resistant fabrics are nylon or polyester with polyurethane backing. It is preferred that upper panel 11 and lower panel 8 be insulated. Examples of such insulation material is Thinsulate® (available from Minnesota Mining and Manufacturing Company) and polyurethane foam.

Preferably, the heat resistant material used to form the pouch should be resistant to temperatures from about 25° F. to about 100° F. greater than the Curie point of the self-regulating material. For example, when the Curie point of the self-regulating material is about 275° F., it is preferred that the heat resistant material is resistant to temperatures of at least 300° F., and more preferably from about 350° F. to about 375° F. Fabric is particularly preferred as the heat resistant material because of its low conductivity. Low conductivity of the pouch heat resistant material is advantageous because the low conductivity of the pouch heat resistant material decreases the rate of heat dissipation from the heat storage member into the interior of the pouch, and thus provides a longer delivery time.

Figure 4:
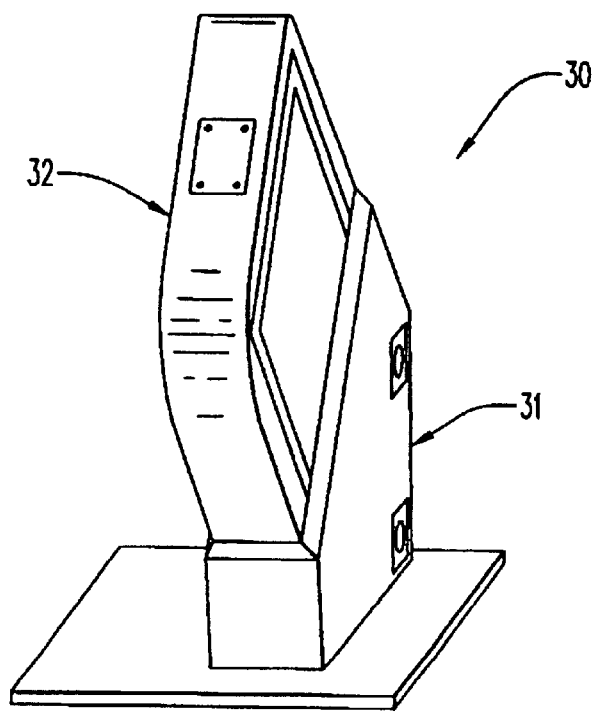
FIG. 4 is a front right-side perspective view of an inductive power generating source of the present invention.
Figure 5:
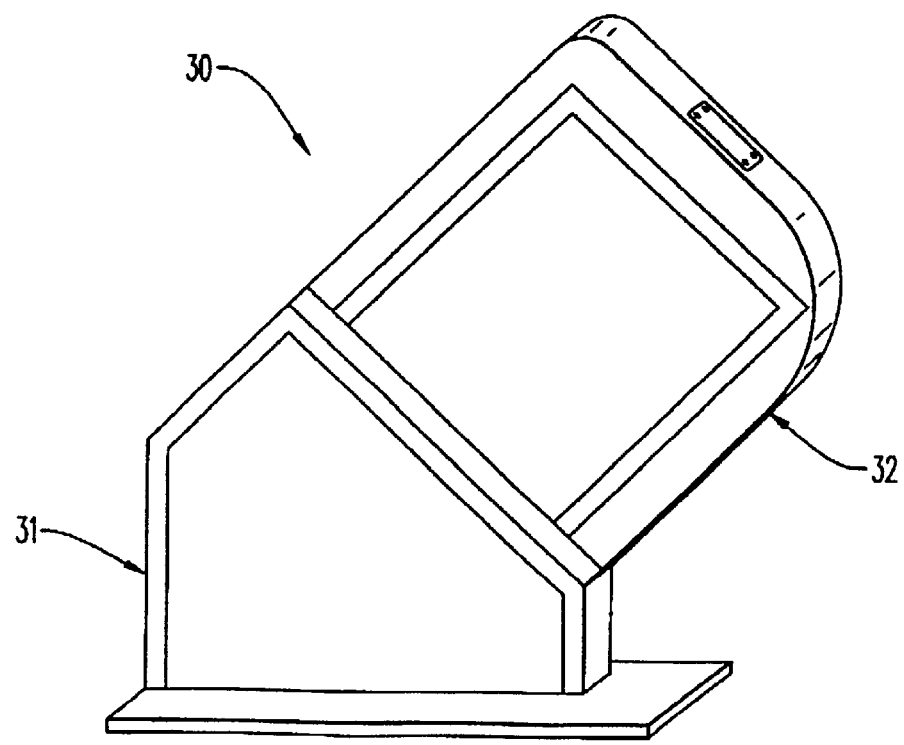
FIG. 5 is a left side view of the inductive power generating source of FIG. 4.

FIG. 4 is a perspective view of one model of an induction generating source 30, for the present invention. This model positions the bag vertically. The induction generating source 30 generally has a stabilizing portion 31 and an energizing portion 32. Stabilizing portion 31 may be secured to the floor or wall by bolts or other chemical or mechanical securing means. The stabilizing portion 31, better shown in FIG. 5 which displays the left side view of the power source, may alternatively be mounted on wheels. As illustrated in FIG. 5, it is preferred that the energizing portion 32 is set at an angle to stabilizing portion 31.

Figure 6:
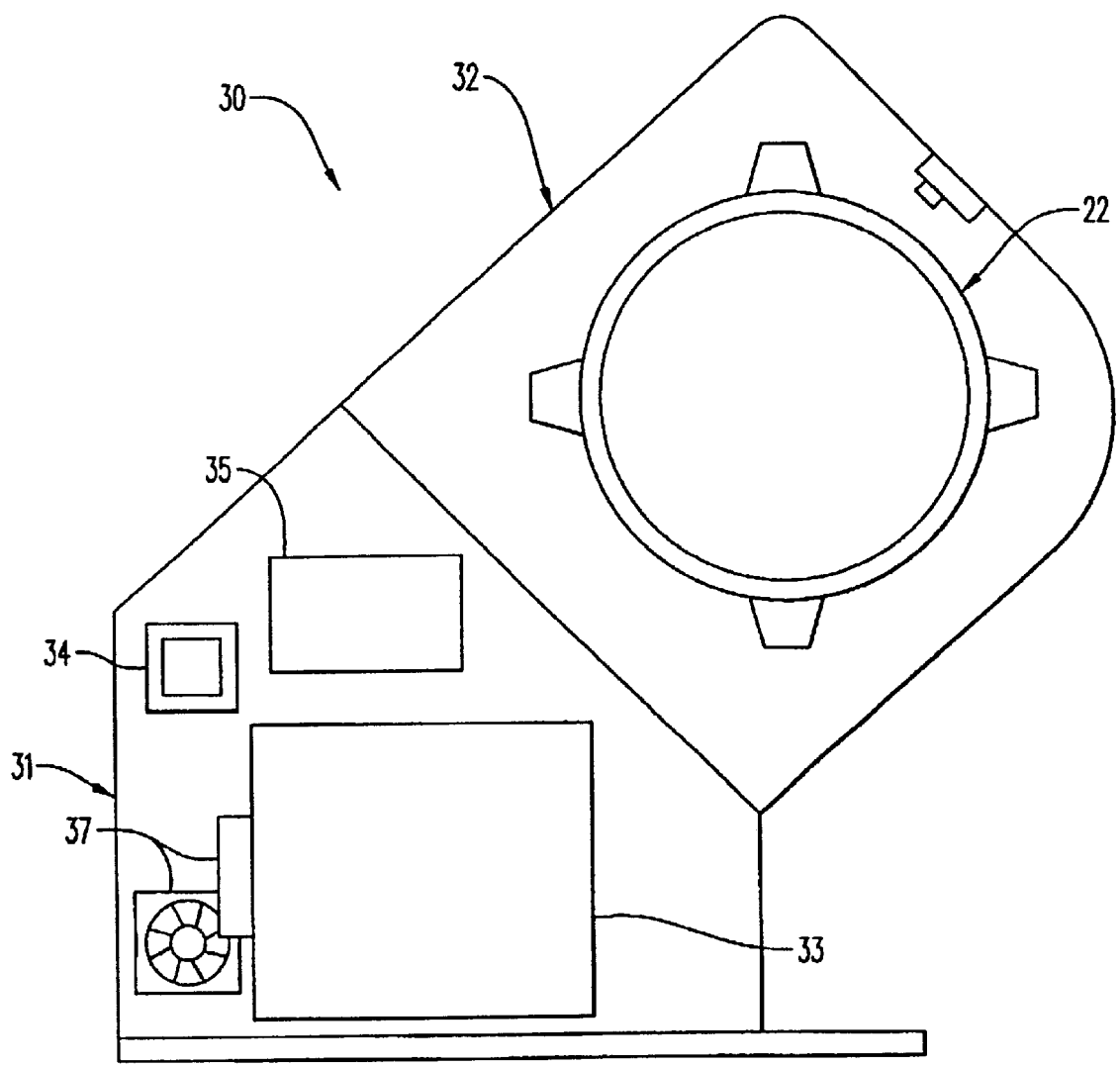
FIG. 6 is a schematic view of the inductive power generating source of FIG. 5 illustrating the relative position of the magnetic induction coil within the top panel thereof.
Figure 7:
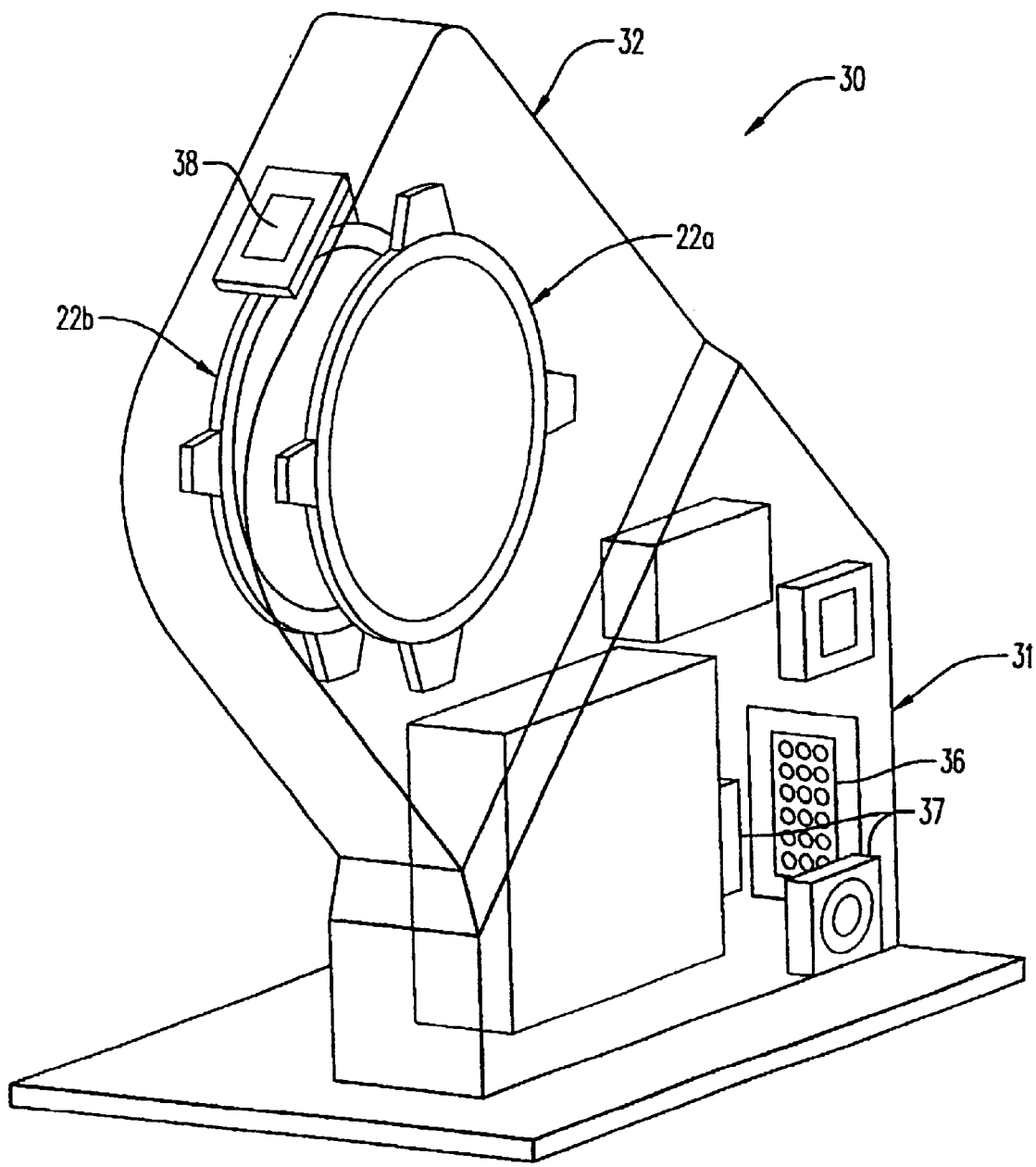
FIG. 7 is a schematic view of the inductive power generating source of FIG. 4 illustrating the parallel disposition of dual magnetic induction coils for activating delivery containers having two heat storage members.

FIG. 6 illustrates a side view of the induction generating source 30 and depicts an inverter 33, a circuit breaker 34, and a controller 35. FIG. 7 is a schematic view depicting some of the miscellaneous components which include, but are not limited to, air inlet apertures 36, fans 37, air filters, Emi filters, switch, plug, cord, wiring and other assembly components. The induction generating source 30 may have a position sensor 38, which is preferably located on the energizing portion 32, that is capable of sensing when a food delivery container is properly positioned on energizing portion, and if the food delivery container is not properly positioned the position sensor prevents induction generating source from activating. More preferably, position sensor 38 is capable of interacting with induction generating source 30 to automatically activate induction generating source 30 when the food delivery container is properly positioned. Various means of providing such positioning sensors are known in the art. A non-limiting example of such a position sensor is a photo-cell type switch. It is also preferred that induction generating source 30 either has or is connected to at least one indicator light/LED (not shown) that indicates when the food delivery container is ready. The induction generating source 30 preferably has separate indicator lights/LED's to indicate power is on, the induction generating source is activated, and the food delivery container is heated and ready for removal.

The energizing portion should have at least one inductive coil. When the food delivery container has two heat storage members, the energizing portion of induction generating source 30 would preferably have at least two inductive coils. It is preferred that the diameter of the inductive coil(s) corresponds to the diameter of the heat storage member(s). Thus, when the heat storage member is a disc-shape having an 8 inch diameter, it is preferred that the diameter of corresponding inductive coil is also 8 inches. Induction generating source 30 has an inductive power source, an inverter and inductive coil. Alternatively, when the food delivery container has two heat storage members as illustrated in FIGS. 2, 3a and 3b, it is preferred that the energizing portion has two inductive coils as illustrated in FIG. 7. It is preferred that when the energizing portion has two induction coils that each induction coil is wired to each other and to the energy source in a series configuration.

The advantage to the angled configuration of the container which is vertically positioned on the generating source is discussed below. When food delivery container 14 illustrated in FIGS. 2 and 3 is used, it is preferred that energizing portion of the energizing post as illustrated in FIGS. 7–9a is designed to fit the first interior compartment 15 of two-compartment food delivery container 14. This prevents food delivery container 14 from being placed incorrectly onto induction generating source 30. In the two-compartment container, the second interior compartment is smaller than the first interior compartment, food delivery container 14 will only fit over induction generating source 30 in a manner that allows both heat storage members (19a,19b) to be adjacent to energizing portions (22a,22b), respectively, of induction generating source 30. In the preferred one-compartment container, the interior compartment fits snugly on the energizing post. In addition to providing proper positioning of the food delivery container relative to the induction energy source, the ergonomic configuration or angle of induction generating source 30 relative to stabilizing base 31 allows for the use of gravity to assist in mounting the food delivery container on induction generating source 30.

Figure 8:
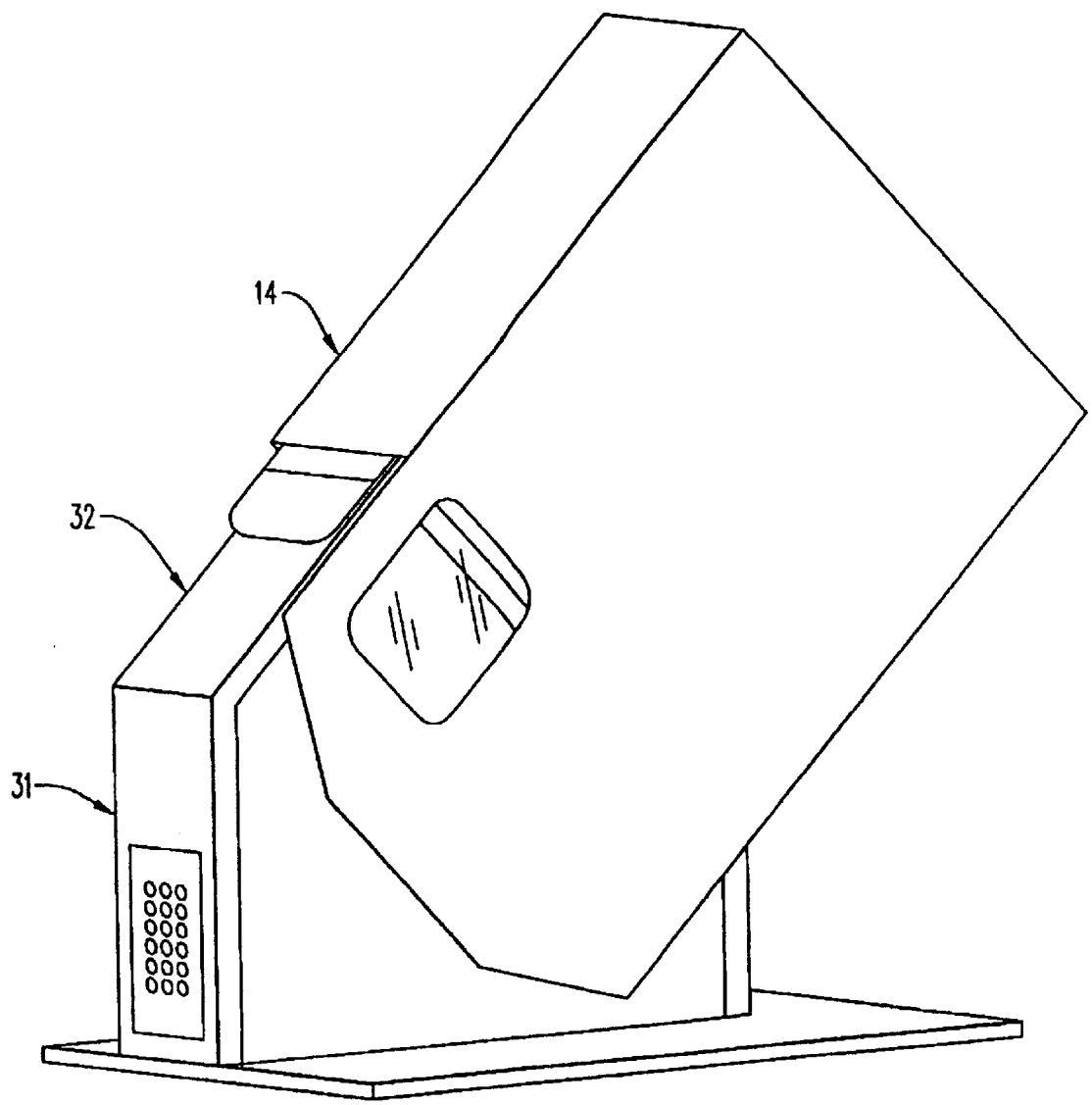
FIG. 8. is a front left-side perspective view of the present invention illustrating the disposition of the food delivery container over the inductive power generating source.
Figure 9:
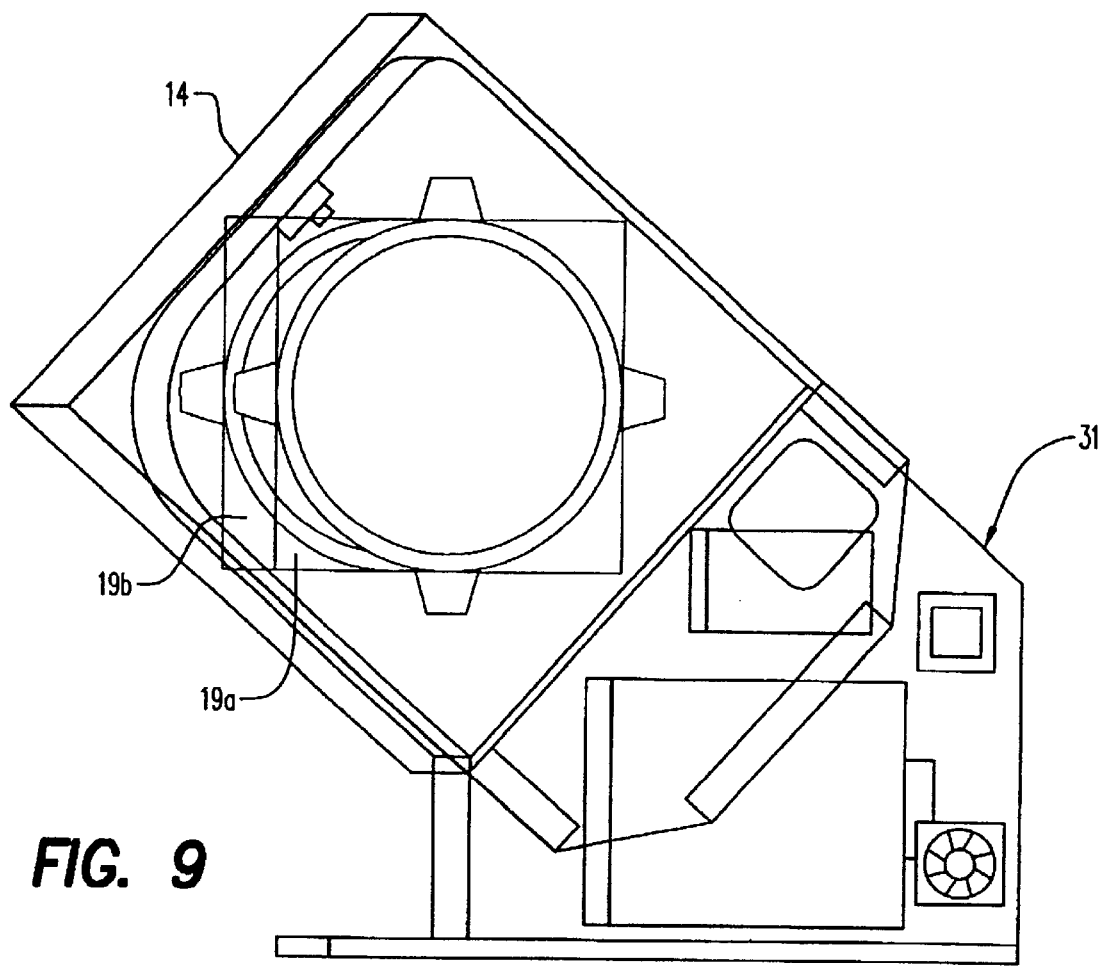
FIG. 9 is a right-side schematic illustration of the disposition a food delivery container about the inductive power generating source of FIG. 8, wherein the heat storage members of the food delivery container are aligned with the magnetic induction coils of the inductive power generating source.
Figure 10A:
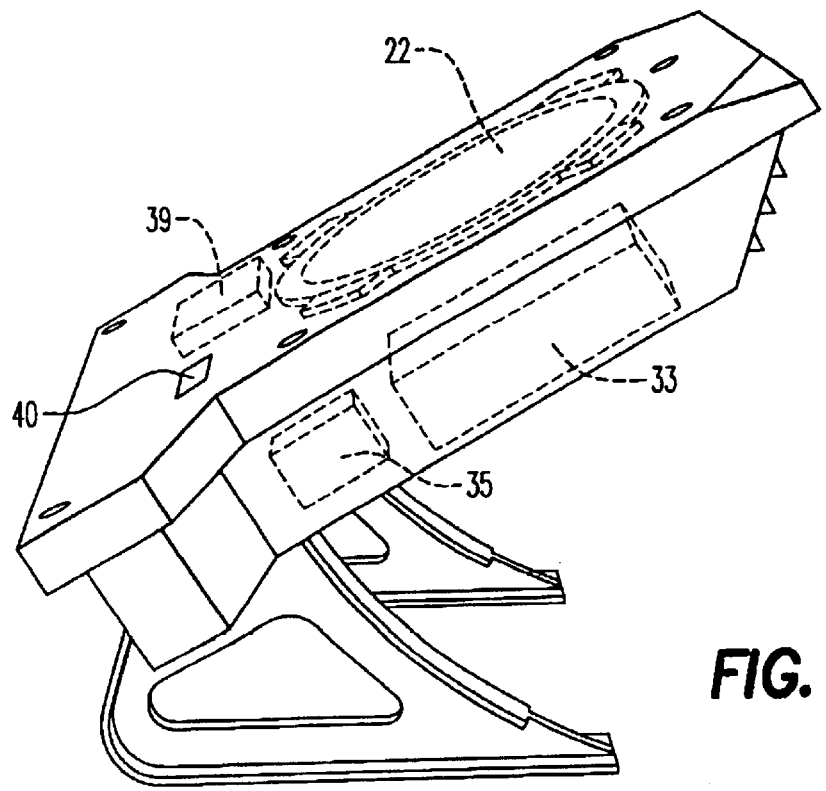
FIG. 10a is a left side view of the horizontally positioned inductive power generating source.
Figure 10B:
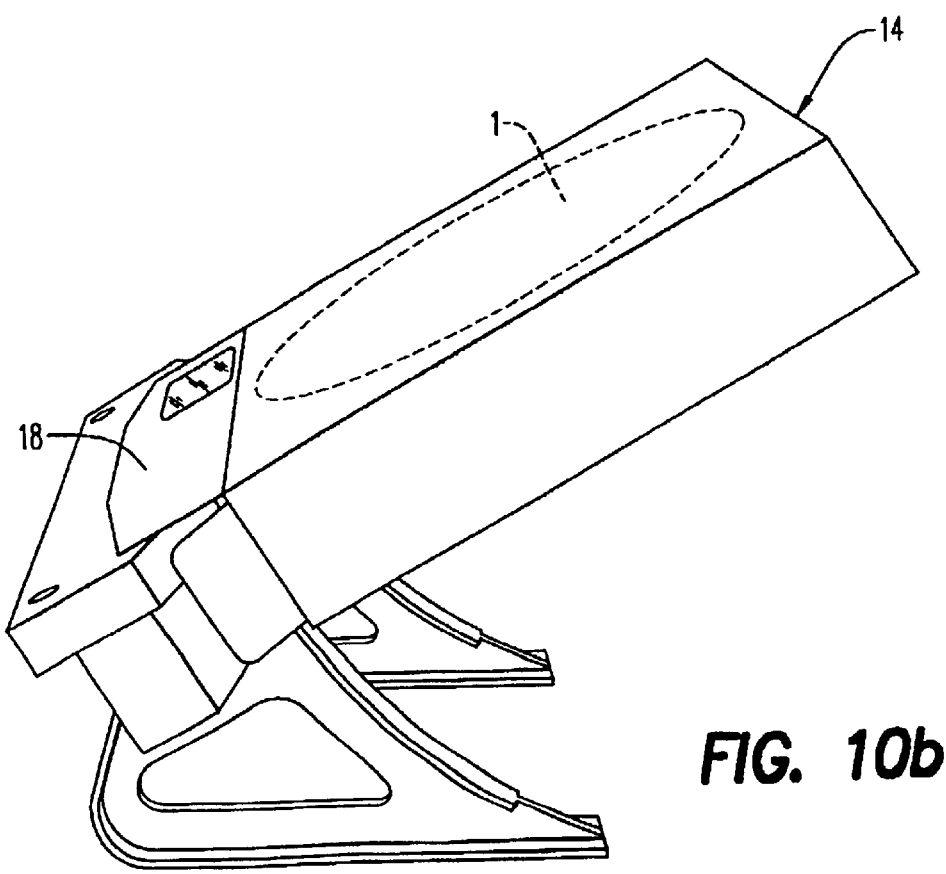
FIG. 10b is a front left-side perspective view of the horizontally positioned inductive power generating source illustrating the disposition of the food delivery container over the inductive power generating source.

An alternative to the induction generating source which positions the food delivery container vertically as shown in FIGS. 4–9, is one that positions the container horizontally (see FIGS. 10a and 10b). This configuration positions the inverter 33 and controller 35 side by side within the source unit. EMI filter 39 is located at the top, adjacent switch 40. In this configuration, the source unit contains only one induction coil 22 positioned on the top surface of the generating source. Although FIG. 10b, shows the container about the energizing post, the container may alternatively rest on top of the induction generating source depending on the position of the heat storage member.

Food delivery container 14 is placed on the energizing portion of induction generating source 30 as seen in FIG. 8 and 10b. The induction generating source has an inverter 33 and controller 35 that interface with each other to activate the power supply to the inductive coil(s). The heat storage member(s) of food delivery container 14 substantially align with the inductive coils of the energizing post as illustrated in FIG. 9. Magnetic material 2 is proximate the respective inductive coil. The inductive power source is activated and the magnetic material of each heat storage member is inductively heated. The resultant heat created in each respective magnetic material is transferred to the respective heat storage material of the heat storage member. As the temperature approaches the Curie point, the self-regulating magnetic material becomes less susceptible to induction because the magnetic property decreases. As the magnetic property decreases so does the measured power absorbed by the magnetic material. At a predetermined temperature and power setting, the induction generating source turns off and stops heating the magnetic material.

Figure 9A:
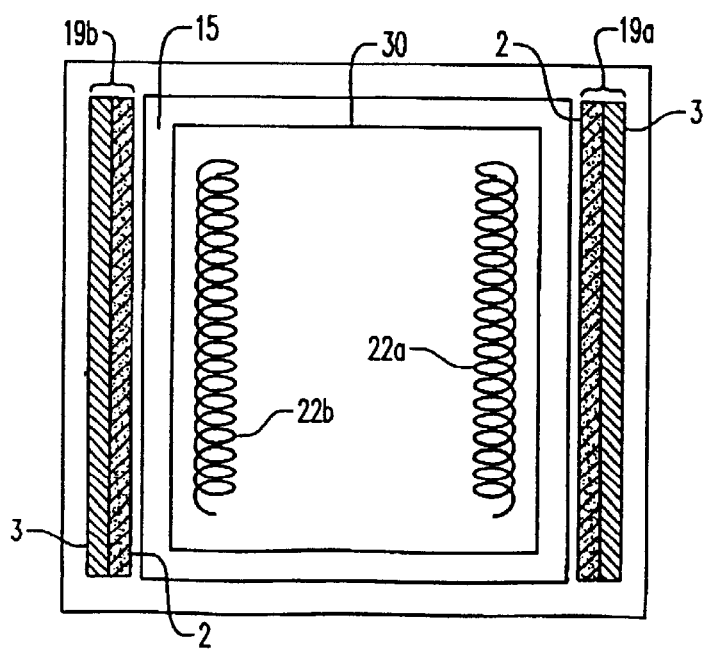
FIG. 9A is a front cross-section schematic illustration of the disposition of the heat storage material and the magnetic material of the heat storage member relative to the magnetic induction coils.

The designs of induction generating source 30 allow for relatively precise alignment of heat storage members (19a, 19b) in food delivery container 14 relative to the location of the inductive coils or energizing portions (22a, 22b) in induction generating source 30. It is important that heat storage members (19a, 19b) be substantially aligned with inductive coils (22a, 22b) during the energizing process. In addition, the design of induction generating source 30 allows for the inductive coil(s) to be closer to the heat storage member(s). With induction, the closer the coil is to the inductive load, the more efficient the heatup. Heating food delivery container 14 from its interior is also more energy efficient than heating from the exterior of food delivery container 14. Referring specifically to FIG. 9a, it is preferred that the heat storage members (19a, 19b) are positioned in food delivery container 14 so that when food delivery container 14 is positioned on the energizing post, magnetic material 2 of heat storage members (19a, 19b) is proximate inductive coils (22a, 22b). A substantial portion of heat storage material 3 is located distal the induction coils. This preferred relative positioning of magnetic material 2, heat storage material 3 and induction coils (22a, 22b) provides more efficient heating of food delivery container 14.

For the source unit shown in FIGS. 10a and 10b which positions the container horizontally, the heat storage member rests on the energizing portion of the induction generating source as seen in FIG. 10b. The magnetic material is easily placed proximate the respective inductive coil because gravity naturally pulls the magnetic material down on the coil. The switch 40 is activated by the bag flap 18 when the bag is correctly installed about the energizing post.

When food delivery container 14 has two eight inch heat storage members (19a, 19b) formed, as described above, with aluminum cast to a magnetic metal comprising nickel, chrome, iron or mixtures thereof, and the energizing post has two eight inch conductive coils (22a, 22b) each receiving 1.25 kW of power, it has been found that heat storage members (19a, 19b) can be energized from ambient temperature to a temperature range from about 240° F. to 275° F. during an initial energizing cycle in approximately sixty (60) seconds. When the food delivery container of the present invention having two eight inch discs, as described above, is energized to approximately 275° F. and is used to deliver pizza(s) having a temperature from about 175° F. to about 200° F., the temperature of the heat storage member and the food will equalize in about 25 minutes. During this initial energizing cycle, the length of the energizing period may be preset according to a predetermined time period. In the alternative, the length of energizing period of the initial energizing cycle may be controlled by method utilized below for subsequent energizing cycles. If the food delivery container is reheated on the energizing post at this 25 minute point, the time necessary to energize the heat storage member to about 275° F. may be as little as thirty seconds or less.

It has been found that when the food delivery container has two heat storage members that are disks approximately eight inches in length having an overall thickness from about 2.5 mm to about 5 mm and formed from casting aluminum to magnetic material having a thickness of about 0.3 mm to about 0.8 mm. It is preferred that induction generating source 30 has a 2.5 kW inverter connected to two eight inch inductive coils. The foregoing allows for 1.25 kW of power to be supplied to each inductive coil. The power source functions through serial communication to a controller. The controller can be programmed to cut off heat at specific temperatures. Connecting multiple coils to the inverter allows for simultaneous heating of different loads or heat storage members. The power source is connected to a multifunction multiprocessor controller with inputs and LED inputs. For cost reduction purposes, the controller and the inverter may be combined into one unit. Also, the food delivery container may alternatively contain one 10.5" disk weighing as much as the two 8" disks.

After the food delivery container is initially energized from ambient temperature, the dissipation of heat over time will cause the temperature of the heat storage member to drop. When the temperature of the heat storage member has not fallen to ambient temperature, shorter subsequent energizing cycles are required to reach the predetermined temperature. The present invention utilizes self-regulation feedback means to deactivate the induction generating source at a temperature less than the Curie point. The Curie point of the material provides a very detailed power curve of output power provided by the inverter. This curve allows for location of a temperature relative to power output. The characteristic power curve is used to determine a preset temperature prior to reaching Curie point where the induction generating source measures the power percentage, and shuts the unit off at the predetermined power.

Figure 11:
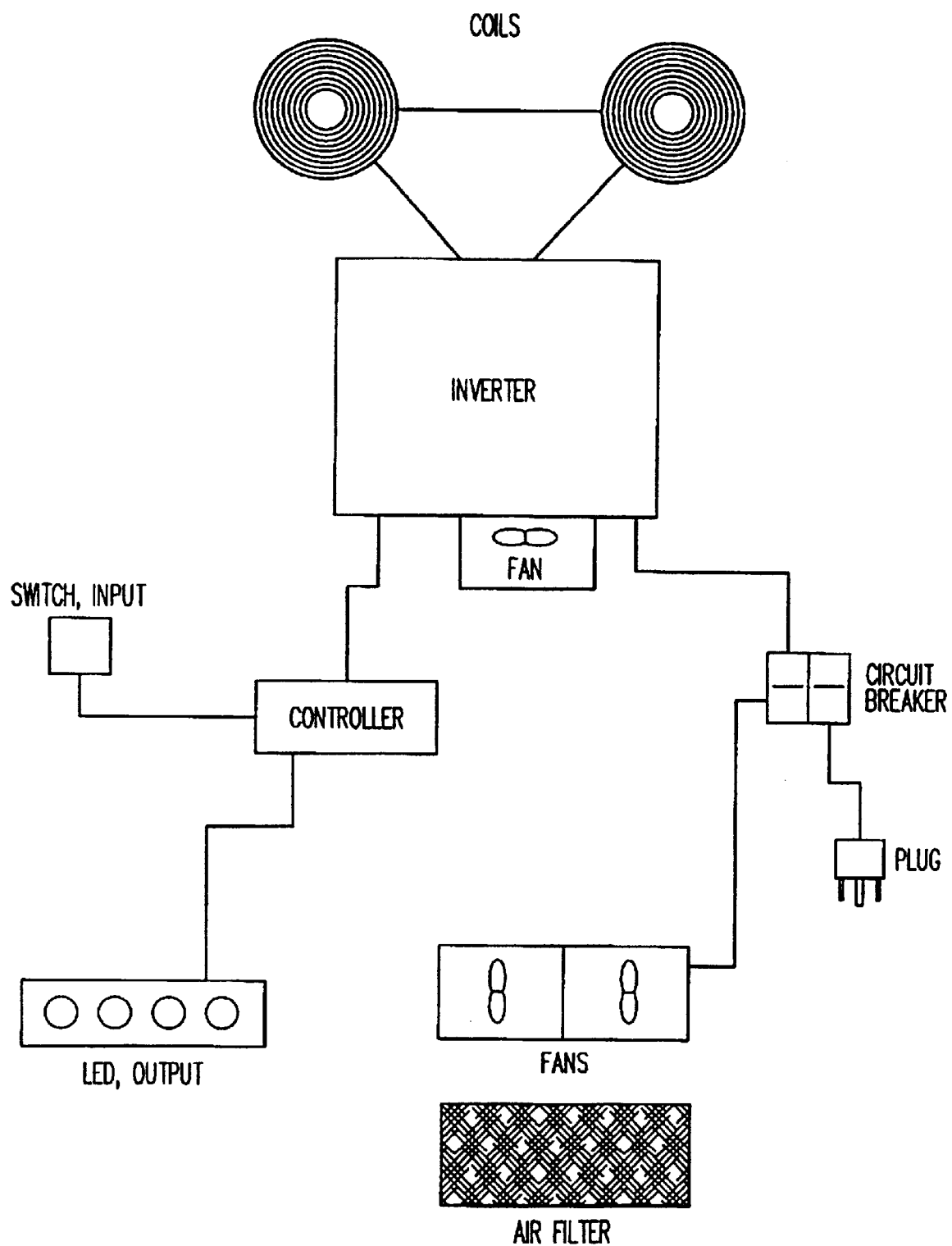
FIG. 11 is a block diagram depicting the electronic system of the induction generating source according to the present invention.
Figure 12:
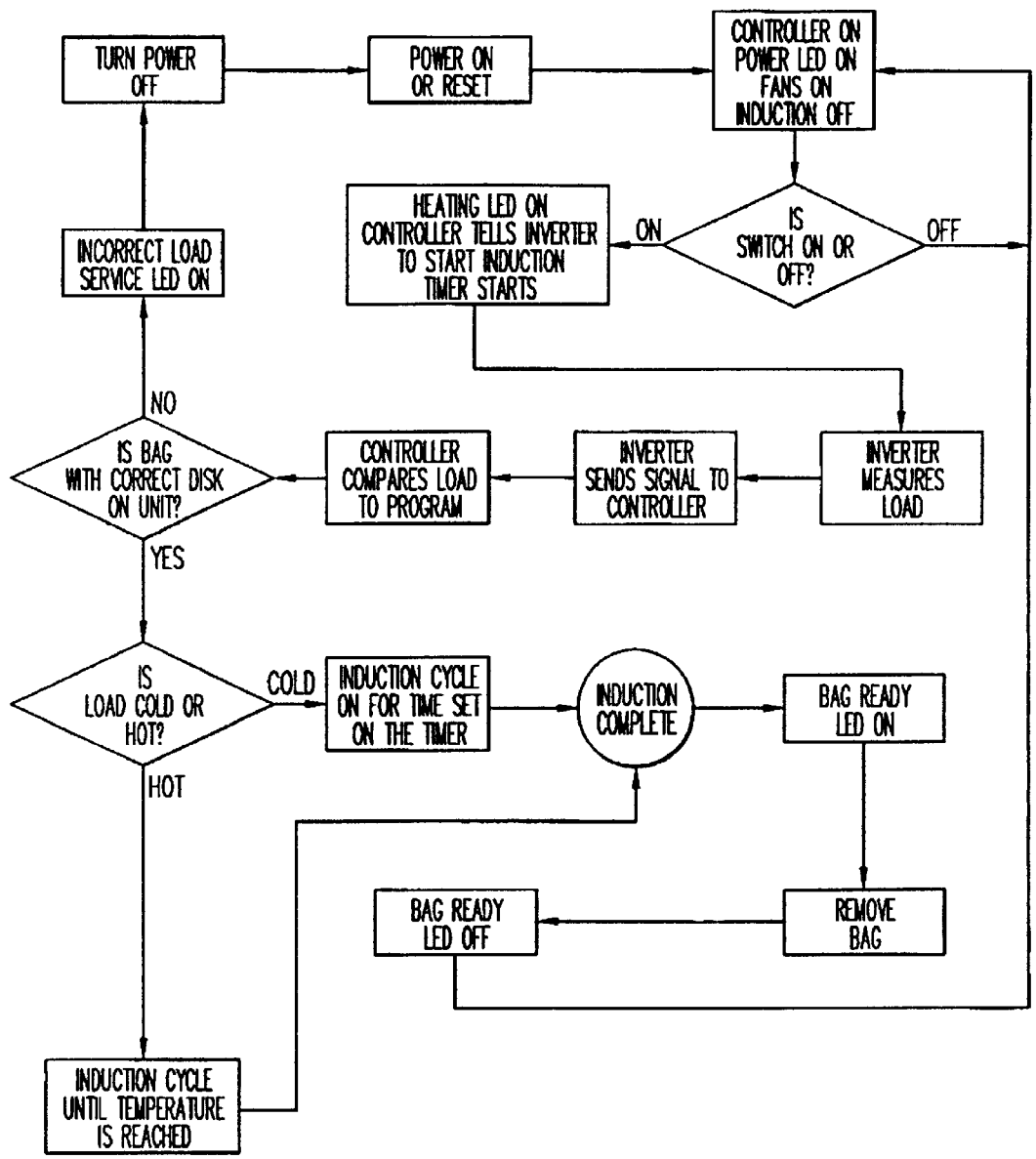
FIG. 12 is a logic diagram of the induction generating source with the fail-safe feature embedded therein.

Various energy/load detection devices are available commercially that provide self-regulation feedback means for energy loading devices. The load can be defined as any magnetic material that can be heated by induction. For the present invention it is preferred that the self-regulation feedback means measure changes in energy which are associated with magnetic induction. For example, self-regulation feedback means would measure changes in impedance, current, voltage, power, or frequency values of the load. In the present invention, the inverter measures the power consumed by the load or heater storage member(s) and communicates the measurements to the controller. The system of control is shown in FIG. 11. As the Curie point of the magnetic material is approached, the load exhibits a measurable and distinctive change. The controller then communicates to the inverter and the power to the induction coil is turned off. Although FIG. 11 shows a separate inverter unit from the controller unit, a combined inverter/controller is possible. Thus, regardless of the initial temperature of the heat storage member at the start of the energizing cycle, the energizing process will turn off when the preset power limit has been attained. The controller has a hold feature to maintain an acceptable temperature for the heat storage member in a given amount of time. The hold feature is advantageous for slower delivery periods when the container has been on the energizing post for an extended amount of time. This hold period has a timed pause (for example, 3 minutes), then reenergizes using the above-stated control so that the container is always ready for use. The hold features repeats this pause/reenergizing cycle a set number of times and then automatically shuts the power off (for example, after 30 minutes). The automatic shut-off conserves energy during periods when delivery is not warranted. This self-regulation feedback means provides conservation of both energy and time. FIG. 12 is a logic diagram of the induction generating source 30 with a fail-safe feature embedded therein.

Further to the conservation of energy and time, the present invention provides a fail-safe safety mechanism that prevents the bags from being destroyed due to overheating, and more importantly, prevents injury to the food service worker. Since the energizing source is deactivated once the predetermined temperature or power limit has been attained, there is no danger that the food delivery container will overheat to a hazardous temperature. The Curie point of the material acts only as a fail safe in case the controller or inverter failed and did not cut off at the predetermined temperature or power limit.

While we have shown and described several embodiments in accordance with our invention, it is to be clearly understood that the same are susceptible to numerous changes apparent to one skilled in the art. Therefore, there is no wish to be limited to the details shown and described, but intend to show all the changes and limitations which come within the scope of the appended claims.

What is claimed is:

1. A container for delivering heated food which comprises:

at least one compartment having an upper panel and a lower panel, wherein a first self-regulating heat storage member is disposed within said lower panel and a second self-regulating heat storage member is disposed within said upper panel, said first and second self-regulating heat storage members comprise a magnetic material which are capable of being heated by means of induction to a predetermined temperature, said predetermined temperature being at or prior to reaching the Curie point of said magnetic material.

2. The container according to claim 1 wherein said magnetic material is selected from the group consisting of: nickel, chrome, iron, and mixtures thereof.

3. A container for delivering heated food which comprises:

at least one compartment having at least one self-regulating heat storage member disposed therein, wherein said self-regulating heat storage member comprises a magnetic material which is capable of being heated by means of induction to a predetermined temperature, said predetermined temperature being at or prior to reaching the Curie point of said magnetic material, and a heat storage material disposed about said magnetic material, wherein said heat storage material acts as a heat sink or storage battery, said magnetic material comprising holes or slits therethrough and panels of said heat storage material are disposed within said holes or slits.

4. The container according to claim 3 wherein said heat storage material comprises a material selected from the group consisting of aluminum, cast iron and mixtures thereof.

5. The container according to claim 3, wherein said magnetic material is selected from the group consisting of: nickel, chrome, iron, and mixtures thereof.

6. The container according to claim 3 wherein said heat storage material is attached to said magnetic material by casting, cladding, or combination thereof.

7. A system for heating food delivery containers which comprises: a container for delivering heated food which comprises at least one food compartment having an upper panel and a lower panel, wherein a first self-regulating heat storage member is disposed within said lower panel and a second self-regulating heat storage member is disposed within said upper panel, said first and second self-regulating heat storage members comprising a magnetic material; and a means for generating induction energy which is capable of heating said magnetic material to a predetermined temperature, said predetermined temperature being at or prior to reaching the Curie point of said magnetic material.

8. The system according to claim 7 further comprising an automatic shut-off control which is capable of turning off said induction generating means when said magnetic material reaches said predetermined temperature.

9. The system according to claim 7 wherein said induction generating means comprises at least one means for generating a magnetic field disposed substantially in alignment with said first and second heat storage members when said container is disposed adjacent to said induction generating means.

10. A system for heating at least one food delivery container which comprises: a container for delivering heated food which comprises at least one compartment having at least one self-regulating heat storage member disposed therein, said self-regulating heat storage member comprising a magnetic material and a heat storage material in thermal contact with said magnetic material, said magnetic material having holes or slits therethrough and panels of said heat storage material disposed in said holes or slits, wherein said heat storage material acts as a heat sink and storage battery; and a means for generating induction energy which is capable of heating said magnetic material to a predetermined temperature, said predetermined temperature being at or prior to reaching the Curie point of said magnetic material.

11. The system according to claim 10 wherein said magnetic material is selected from the group consisting of: nickel, chrome, iron and mixtures thereof.

12. The system according to claim 10 wherein said heat storage material is selected from the group consisting of: cast iron, aluminum and mixtures thereof.

13. A method of heating a food delivery container which comprises:

placing a container about an induction generating means, said container comprising at least one food compartment having at least one self-regulating heat storage member disposed therein, said self-regulating heat storage member comprising a magnetic material and a heat storage material in thermal contact with said magnetic material, said magnetic material having holes or slits therethrough and panels of said heat storage material disposed in said holes or slits, wherein said heat storage material acts as a heat sink and storage battery;

activating said induction generating means to heat said heat storage member to a predetermined temperature; and deactivating said induction generating means once the heat storage member reaches said predetermined temperature, said predetermined temperature being at or prior to reaching the Curie point of said magnetic material.

14. The method according to claim 13 wherein said deactivation step occurs automatically at said predetermined temperature.

* * * * *